(12) United States Patent
Jones et al.

(10) Patent No.: US 7,194,866 B1
(45) Date of Patent: Mar. 27, 2007

(54) STATIC STRUCTURE FOR AN EXPENDABLE GAS TURBINE ENGINE

(75) Inventors: Anthony Jones, San Diego, CA (US); Mark Harris, San Diego, CA (US); Eric Alexander, San Diego, CA (US); Patrick Lydon, San Marcos, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 481 days.

(21) Appl. No.: 10/600,401

(22) Filed: Jun. 20, 2003

(51) Int. Cl.
*F02C 7/20* (2006.01)
*F02C 7/06* (2006.01)
*F02C 1/00* (2006.01)

(52) U.S. Cl. .................. 60/796; 60/798; 60/39.08; 60/758

(58) Field of Classification Search .................. 60/798, 60/796, 804, 760, 758, 39.08
See application file for complete search history.

(56) References Cited

U.S. PATENT DOCUMENTS

| | | | |
|---|---|---|---|
| 3,527,055 A | 9/1970 | Rego | |
| 3,678,306 A | 7/1972 | Garnier et al. | |
| 3,705,775 A | 12/1972 | Rioux | |
| 3,961,199 A | 6/1976 | Bronicki | |
| 3,965,673 A | 6/1976 | Friedrich | |
| 4,038,815 A * | 8/1977 | Heitmann et al. | 60/39.08 |
| 4,242,865 A | 1/1981 | Harrison et al. | |
| 4,308,463 A | 12/1981 | Giras et al. | |
| 4,450,361 A | 5/1984 | Holt | |
| 4,490,622 A | 12/1984 | Osborn | |
| 4,743,776 A | 5/1988 | Baehler et al. | |
| 4,769,993 A | 9/1988 | Kawamura | |
| 5,014,508 A | 5/1991 | Lifka | |
| 5,201,798 A | 4/1993 | Hogan | |
| 5,207,054 A * | 5/1993 | Rodgers et al. | 60/804 |
| 5,237,817 A | 8/1993 | Bornemisza et al. | |
| 5,454,222 A | 10/1995 | Dev | |
| 5,497,615 A | 3/1996 | Noe et al. | |
| 5,555,722 A | 9/1996 | Mehr-Ayin et al. | |
| 5,558,502 A | 9/1996 | Fukazawa et al. | |
| 5,577,380 A | 11/1996 | Shekleton et al. | |
| 5,722,228 A | 3/1998 | Lampe et al. | |
| 5,727,378 A * | 3/1998 | Seymour | 60/804 |
| 5,906,096 A | 5/1999 | Siga et al. | |
| 5,927,066 A | 7/1999 | Shekleton et al. | |
| 5,960,625 A | 10/1999 | Zdvorak, Sr. | |
| 5,966,926 A | 10/1999 | Shekleton et al. | |
| 6,065,281 A | 5/2000 | Shekleton et al. | |
| 6,082,112 A | 7/2000 | Shekleton | |
| 6,178,751 B1 | 1/2001 | Shekleton et al. | |

(Continued)

FOREIGN PATENT DOCUMENTS

WO  WO 80/02585  11/1980

*Primary Examiner*—Charles G. Freay
(74) *Attorney, Agent, or Firm*—Carlson, Gaskey & Olds

(57) ABSTRACT

A static structure for a miniature gas turbine engine includes a forward housing, a forward cover, a diffuser housing, a diffuser, a turbine nozzle, a combustor liner, a combustor housing and an exhaust pipe with relatively uncomplicated assembly interfaces. The static structure defines airflow and lubrication passages which communicate lubricant and airflow to each shaft bearing such that an adequate measured quantity of lubricant is supplied to the bearings in response to engine speed. The airflow through the airflow passage carries the lubrication supplied to the forward bearing toward the aft bearing to further lubricate the aft hot section bearing.

15 Claims, 7 Drawing Sheets

U.S. PATENT DOCUMENTS 6,307,278 B1 10/2001 Nims et al.
6,314,717 B1 11/2001 Teets et al.
6,392,313 B1 5/2002 Epstein et al.
6,453,676 B1 9/2002 Ho et al.
6,470,258 B1 10/2002 Leamy et al.
6,498,978 B2 12/2002 Leamy et al.

* cited by examiner

STATIC STRUCTURE FOR AN EXPENDABLE GAS TURBINE ENGINE

BACKGROUND OF THE INVENTION

The present invention relates to a miniature gas turbine engine and, more particularly, to the non-moving structure therefore.

Miniature gas turbine or turbojet engines (100 lbf thrust and smaller) are often utilized in single usage applications such as reconnaissance drones, cruise missiles, decoy and other weapon applications, including air-launched and ground-launched weapon systems. The use of such an engine greatly extends the range of the weapon in comparison to the more conventional solid fuel rocket engine. Miniature gas turbine engines are difficult to fabricate economically for general expendable usage in large numbers.

The array of programs and potential programs are now often entitled by the defense department with words such as "Low Cost" and "Affordable". To achieve economically feasible extended range expendable propulsion sources, it is necessary that the gas turbine engines be manufactured relatively inexpensively yet provide a high degree of reliability and efficiency. Components that greatly affect manufacturing expenses are the components that form the non-moving or static structure of the gas turbine engine.

The static structure components often require precisely machined surfaces and interfaces that may typically carry over much technology from the conventional long-life main thrust engine market. Although effective and reliable, such conventional engine technology may be too expensive for application to a miniature gas turbine engine. Conversely, existing turbo charger applications commonly used in the commercial model aircraft industry provide inexpensive components but generally fails to meet the high altitude starting, performance and reliability requirements demanded of defense programs.

Accordingly, it is desirable to provide an uncomplicated and inexpensive static structure assembly for an expendable gas turbine engine.

SUMMARY OF THE INVENTION

The static structure according to the present invention for a miniature gas turbine engine includes a forward housing, a forward cover, a diffuser housing, a diffuser, a turbine nozzle, a combustor liner, a combustor housing, and an exhaust pipe. The static structure provides a relatively low part count with uncomplicated assembly interfaces, which decrease expense and manufacturing complications.

The static structure defines airflow and lubrication passages that communicate lubricant and airflow to each shaft bearing. A shaft driven pump supplies lubricant from a source to a metering jet in communication with the lubrication passage such that flow rate varies relative the rotor shaft speed. An adequate measured quantity of lubricant is thereby supplied to the bearings in response to engine speed which assures proper lubrication of the bearings. The airflow through the airflow passage carries the lubrication supplied to the forward bearing toward the hot section aft bearing. From the aft bearing, residual lubricant continues toward the exhaust pipe where the lubricant is at least partially combusted.

Fuel usage for lubrication and/or the weight of oil tanks is thereby minimized by the present invention such that the engine provides a lower weight and/or extended range.

The present invention therefore provides an uncomplicated and inexpensive static structure assembly for an expendable gas turbine engine.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
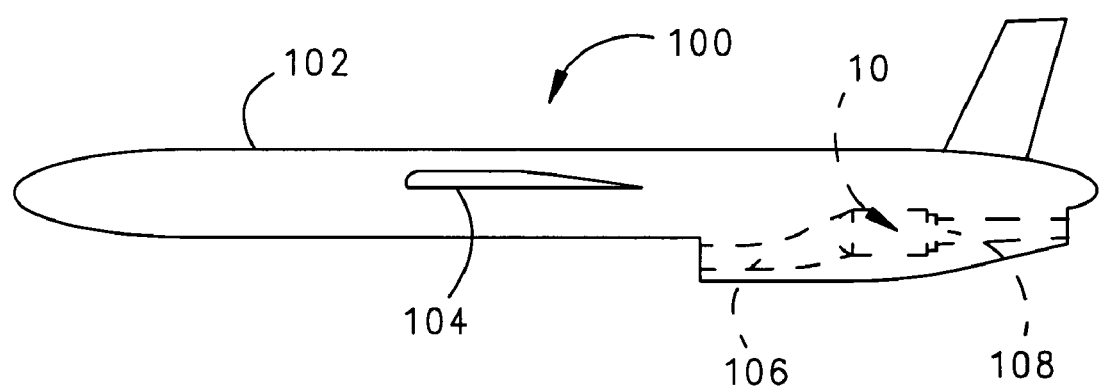
FIG. 1 is a general perspective view an exemplary vehicle embodiment for use with the present invention.

FIG. 1 illustrates a general schematic view of a vehicle 100 including a miniature gas turbine engine 10 according to the present invention. The vehicle 100 includes a body 102 and one or more aerodynamic surfaces 104. The engine 10 is coupled to, or within, the body 102. An intake 106 provides air to the engine 10, and an exhaust pipe 108 exhausts the thrust therefrom. The engine 10 of the invention may also be used in other single usage and reusable applications such as reconnaissance drones, cruise missiles, decoys and other weapon and non-weapon applications.

Figure 2:
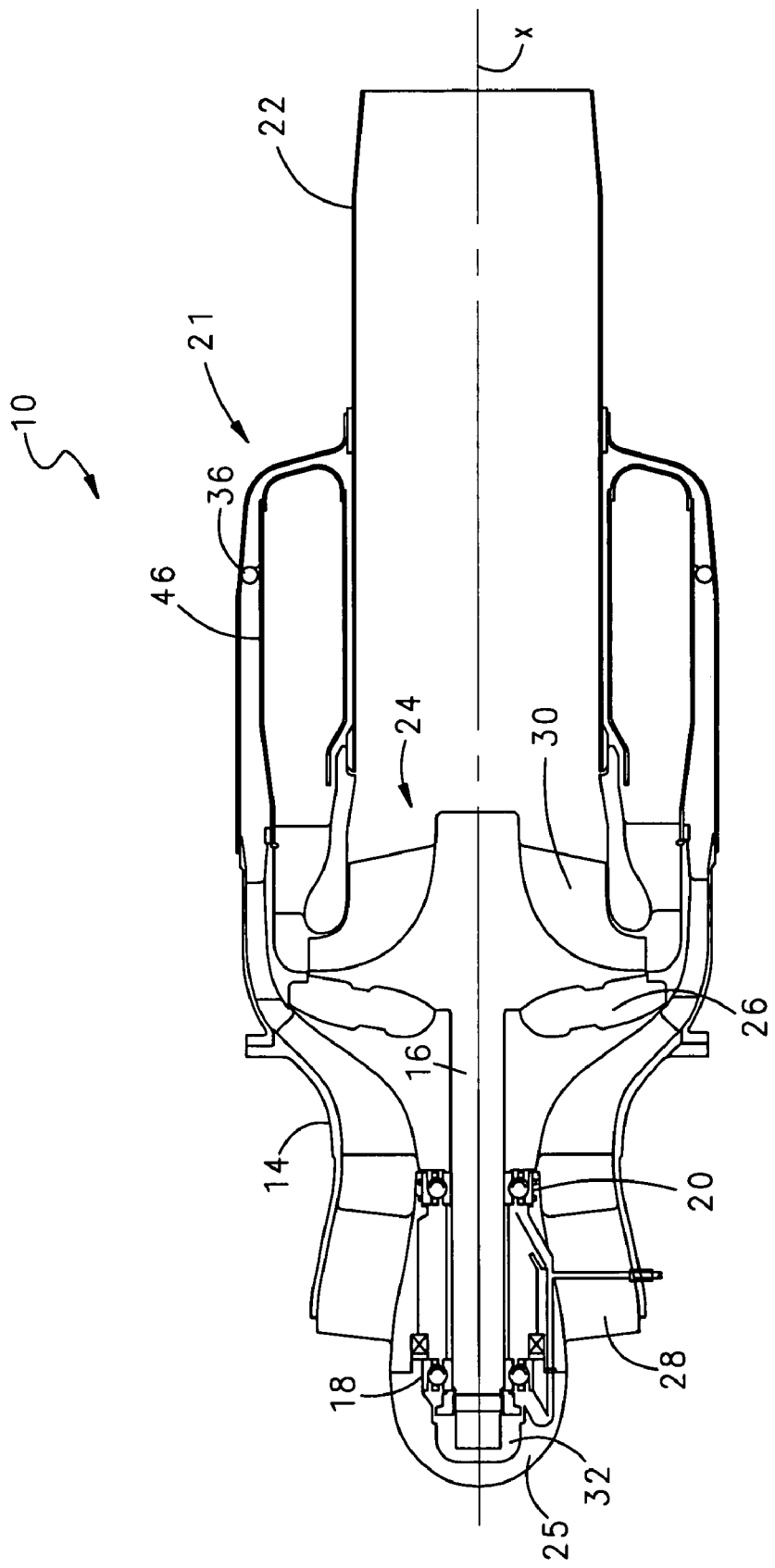
FIG. 2 is a schematic view of a gas turbine engine according to the present invention.

Referring to FIG. 2, the miniature gas turbine engine 10 generally includes a forward housing 14, a rotor shaft 16 rotationally mounted to a forward bearing 18 and an aft bearing 20, a combustion system 21 and an exhaust pipe 22. The rotor shaft 16 rotates about a longitudinal axis X although other forms of rotors, such as a monorotor configuration, would also benefit from the present invention.

In the illustrated rotor configuration, a rotor system 24 includes compressor blades 26 facing forward toward an inlet 28 and turbine blades 30 facing rearward toward the exhaust pipe 22 to define a turbine wheel. The forwardly extending shaft 16 is received in the bearings 18, and 20 and is preferably coupled to a forward cover 25. The forward cover 25 preferably defines a fuel pump cavity (illustrated schematically at 32) to provide fuel to an annular combustor liner 46 through a fuel manifold 36 (also illustrated in FIG. 3).

Figure 3:
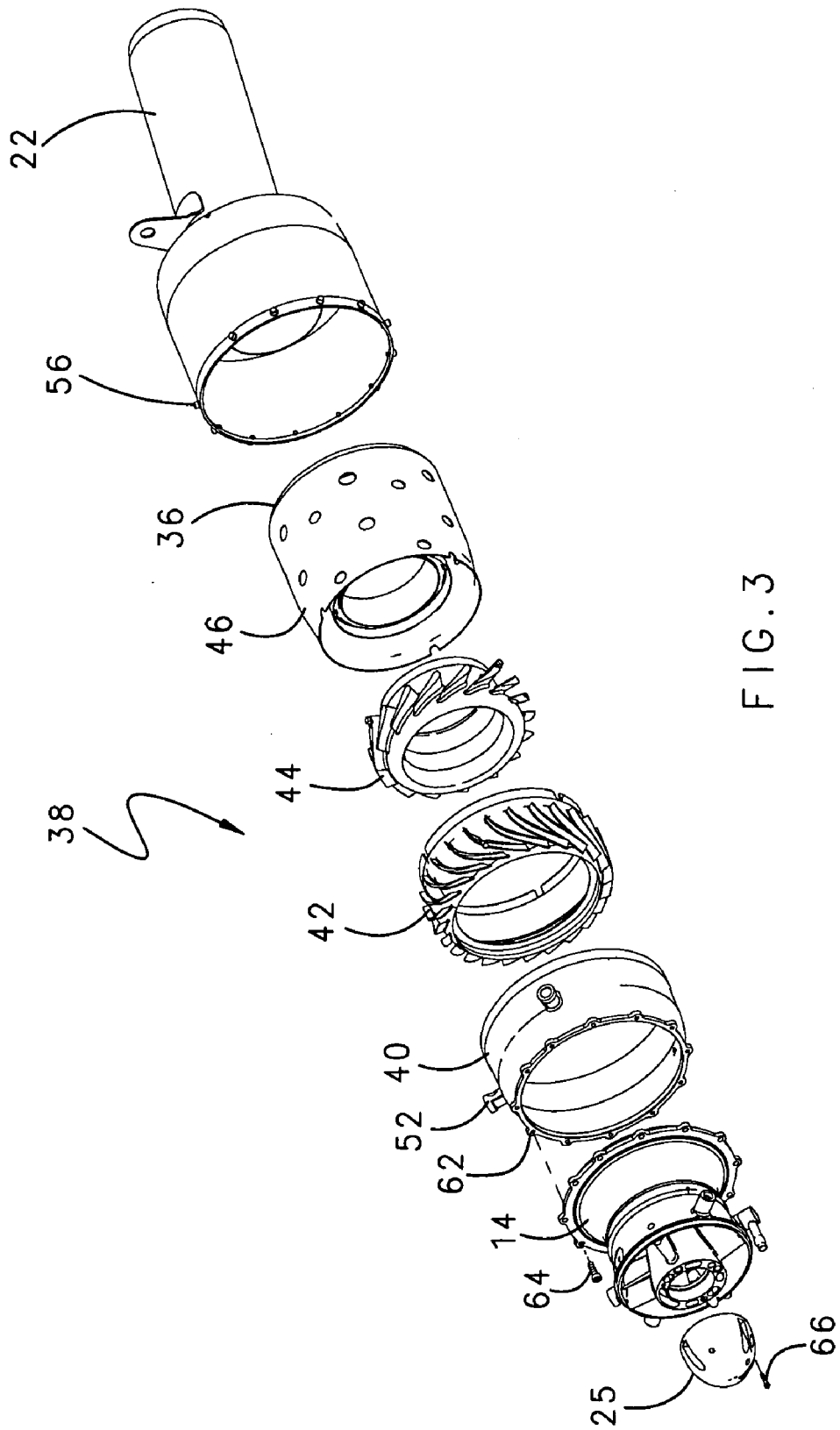
FIG. 3 is a perspective exploded view of a static structure for a gas turbine engine.
Figure 4:
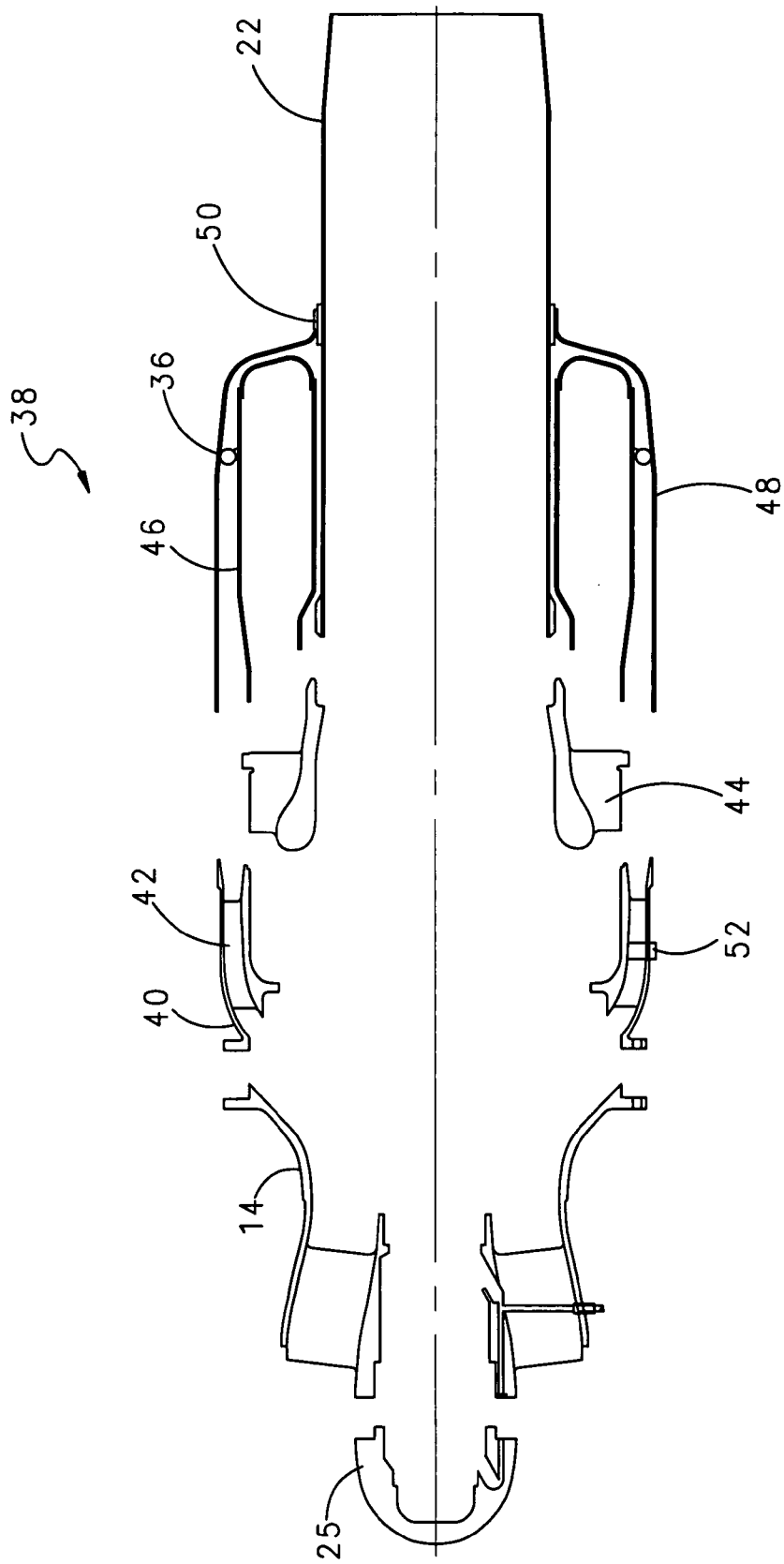
FIG. 4 is a sectional view of a static structure for a gas turbine engine.

Referring to FIG. 3, the static structure 38 of the engine 10 is illustrated in a perspective exploded view and in a sectional view in FIG. 4. The static structure 38 includes the forward housing 14, the forward cover 25, a diffuser housing 40, a diffuser 42, a turbine nozzle 44, the combustor liner 46, a combustor housing 48 and the exhaust pipe 22. The static structure 38 provides relatively low part count thereby simplifying assembly and decreasing expense. The static structure 38 is manufactured of relatively low cost materials such as aluminum castings, forgings, stainless steels castings, forgings, sheet metal, molded composites, ceramics or the like.

Figure 5:
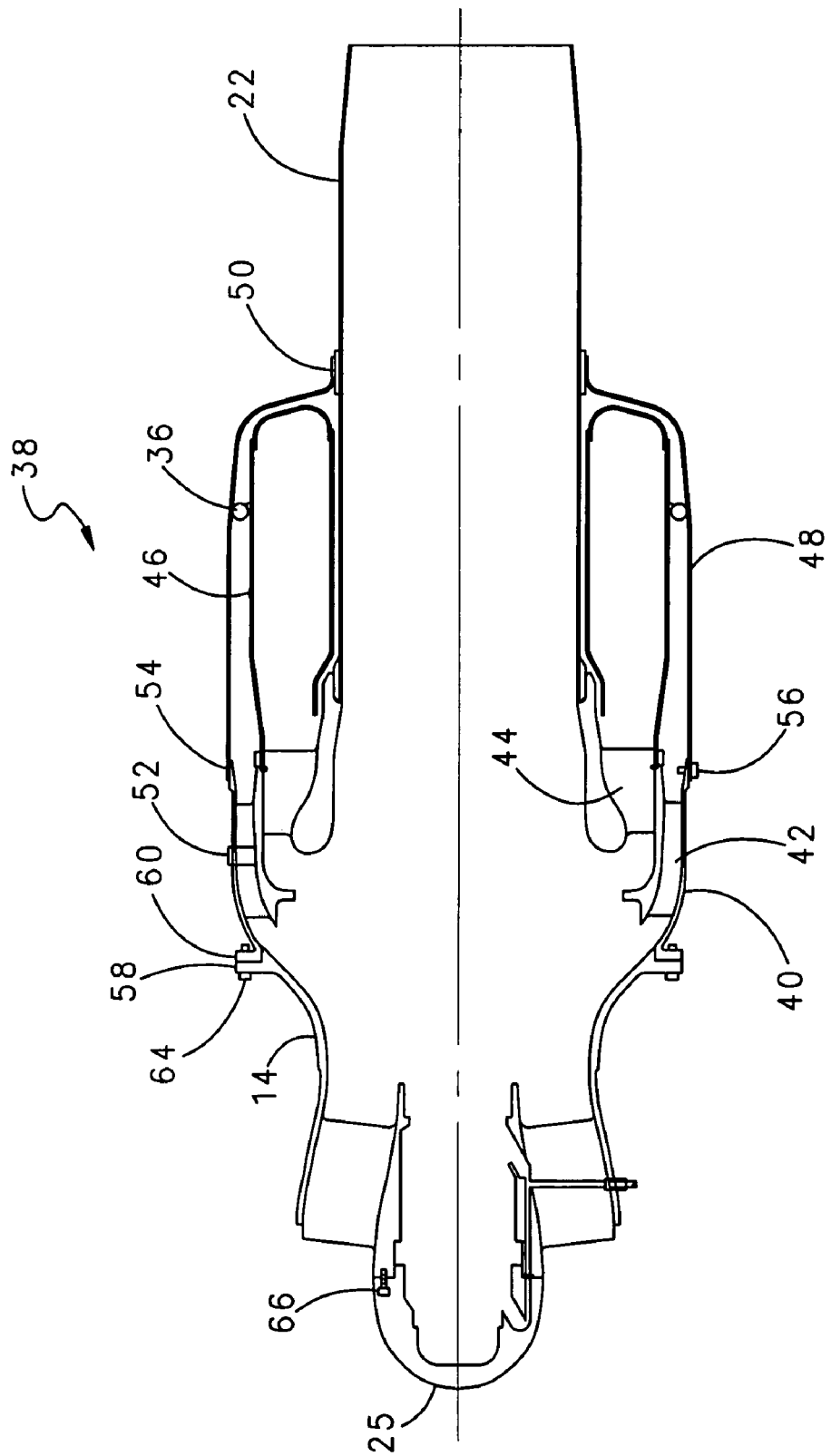
FIG. 5 is a sectional view of a static structure of FIG. 4 separated into its constituent components.

Referring to FIG. 5, the exhaust pipe 22 is preferably welded into the combustor housing 48 at a combustor interface 50. The combustor housing 48 receives the combustor liner 46 followed by the turbine nozzle 44. The diffuser housing 40 includes a plurality of pins 52 (FIG. 3) which locate the diffuser 42 therein. That is, the pins 52 center the diffuser 42 within the diffuser housing 40 (FIG. 5). The combustor liner 46 and the turbine nozzle 44 are sandwiched between the combustor housing 48 and the diffuser housing 40 which are preferably welded together at diffuser interface 54. Other attachment techniques, such as pins 52, will alternatively or additionally benefit from the present invention.

Preferably, each component 14, 25, 40, 42, 44, 46, 48 and 22 is assembled together by one or more relatively low cost fastening techniques such as threaded fasteners, welding, v-band clamps, rivets, or the like. One of ordinary skill in the art in combination with the disclosure of the present application will readily determine the appropriate fastening technique for the particular component interface.

The forward housing 14 includes a forward radially extending flange 58 and the diffuser housing 40 includes a radial extending diffuser flange 60. The forward housing 14 is mounted to the diffuser housing 40 through an interface of the forward radially extending flange 58 and the radial extending diffuser flange 60 which includes a multiple of threaded apertures 62 (best viewed in FIG. 3) to receive a plurality of threaded fasteners 64. Lastly, the forward cover 25 is then mounted to the forward housing 14 with a multiple of threaded fasteners 66.

Figure 6:
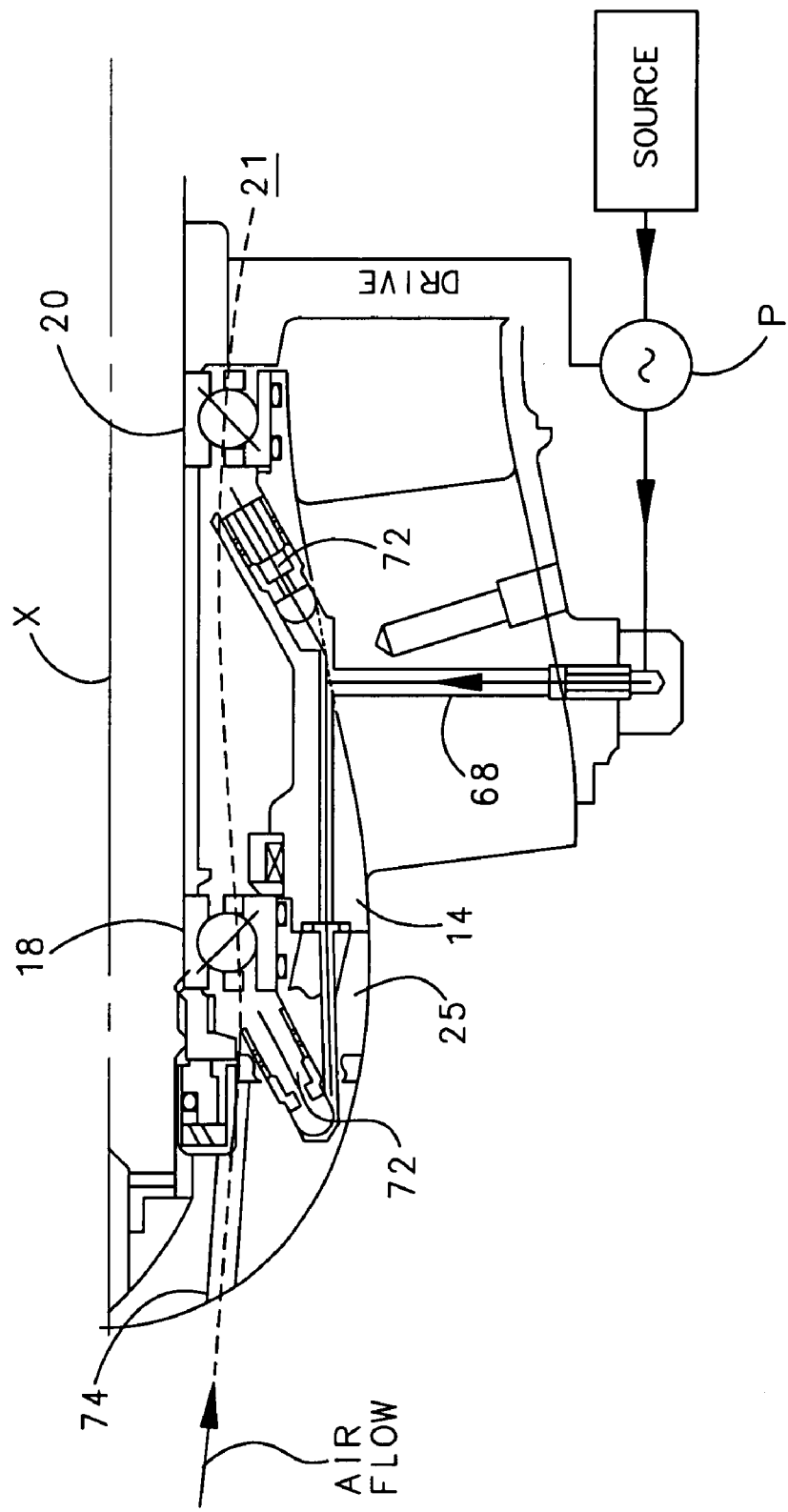
FIG. 6 is an expanded sectional view of a lubrication scheme within a static structure.

Referring to FIG. 6, the forward cover 25 and the forward housing 14 include a lubrication passage 68 which communicate a lubricant such as fuel, oil or a mixture thereof from a source 70 (illustrated schematically) to the bearings 18 and 20. It should be understood that although only a single passage 68 is illustrated in the sectional view of FIG. 6, a multiple of passages 68 communicate with the bearings 18, 20 at a plurality of radial locations thereabout.

Figure 7:
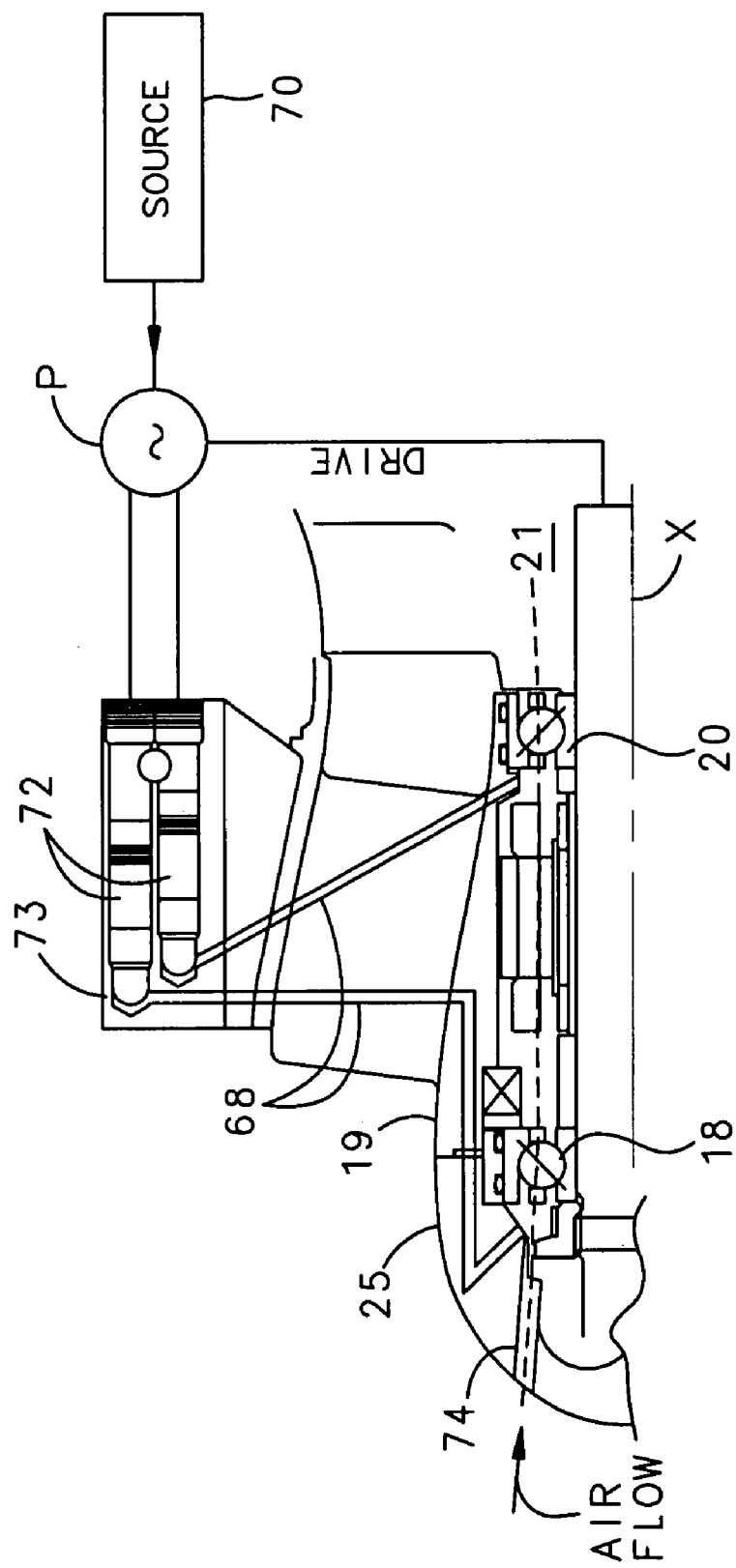
FIG. 7 is an expanded sectional view of another lubrication scheme within a static structure.

Preferably, each passage 68 which communicates with each bearing 18, 20 includes a metering jet 72 such as the encapsulated miniature precision flow restrictor manufactured by The Lee Company of Westbrook Conn. The metering jet 72 is preferably located adjacent each bearing 18, 20. Alternatively, the metering jet 72 may be located remote from the bearings 18, 20 and outside of the forward housing 14 in a connection block 73 such that lubricant is received from the source 70 directy therein prior to communication through the passage 68 (FIG. 7). It should be understood that other restrictions such as machined orifices for a specific flow rate, separately installed encapsulate metering jets and/or separately installed metering or "wiggle" wire will also benefit from the present invention.

Preferably, a pump P supplies lubricant from the source 70 to the metering jet 72 under pressure. The shaft rotor 16 shaft preferably drives the pump P (illustrated schematically) such that the flow rate varies relative the rotor shaft 16 speed. An adequate measured quantity of lubricant is thereby always supplied to the bearings 18, 20 in response to engine speed to assure proper lubrication of the bearings 18, 20.

The forward cover 25 further includes an airflow passage 74 which directs airflow A toward the bearings 18, 20. It should be understood that although only a airflow passage 74 is illustrated in the sectional view of FIG. 6, a multiple of airflow passage 74 communicate with the bearings 18, 20 at a plurality of radial locations thereabout.

As the aft bearing 20 is a hot section bearing closer to the combustion system 21, additional lubricant is preferred. The airflow through airflow passage 74 carries residual lubrication supplied to the forward bearing 18 toward the aft bearing 20. That is, the airflow through airflow passage 74 operates to both air cool the bearings 18, 20 and communicate residual lubricant supplied to the forward bearing 18 aft along the shaft 16 where the lubricant operates to further lubricate and cool the aft bearing 20. From the aft bearing 20, the residual lubricant continues toward the exhaust pipe where the lubricant is at least partially combusted within the combustor system 21.

The present invention provides an efficient low flow lubrication scheme. The lubricant/airflow scheme of the present invention utilizes a lubricant flow of approximately 5% flow of lubricant flow relative engine flow as compared to approximately 10% for conventional miniature turbojets. Fuel usage for lubrication and/or the weight of oil tanks is thereby minimized by the present invention such that the engine 10 is of a lower weight and/or provides an extended vehicle range.

For increased lubricity the present invention provides a lubrication 10:1 mixture by volume of JP-10 and DERD 2487 synthetic mixed Ester with 2% Tricresyl Phoshpate (TCP). Equivalent and beneficial lubrication mixtures include 10:1 mixture by volume of JP-10 and DEF STN 91-98 synthetic mixed Ester with 2% Tricresyl Phoshpate (TCP), or 10:1 mixture by volume of JP-10 and NATO 0-149 synthetic mixed Ester with 2% Tricresyl Phoshpate (TCP) or 10:1 mixture by volume of JP-10 and NATO 0-159 synthetic mixed Ester with 2% Tricresyl Phoshpate (TCP). Fuel with lubricity described eliminates the weight of oil tanks thereby minimized by the present invention such that the engine 10 is of a lower weight and/or provides an extended vehicle range.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A static structure for a miniature gas turbine engine comprising:
   a forward housing;
   a diffuser housing mounted to said forward housing;
   a combustor housing mounted to said diffuser housing; and
   a forward cover mounted to said forward housing, said forward cover having an airflow passage defined within said forward cover, said airflow passage communicating airflow toward a first and a second rotor shaft bearing.

2. The static structure as recited in claim 1, further comprising an exhaust pipe mounted to said combustor housing.

3. The static structure as recited in claim 1, further comprising a turbine nozzle mounted without fasteners between said diffuser housing and said combustor housing.

4. The static structure as recited in claim 1, further comprising a lubrication passage defined within said forward housing, said lubrication passage communicating with a rotor shaft bearing.

5. The static structure as recited in claim 4, further comprising a metering jet in communication with said lubrication passage.

6. The static structure as recited in claim 5, further comprising a rotor shaft driven pump which communicate a lubricant through said lubrication passage.

7. The static structure for a miniature gas turbine engine comprising:
a forward housing;
a diffuser housing mounted to said forward housing;
a combustor housing mounted to said diffuser housing;
a combustor liner sandwiched without fasteners between said diffuser housing and said combustor housing; and
a forward cover mountable to said forward housing, said forward cover having an airflow passage which communicates airflow toward a lubrication passage defined within said forward housing.

8. The static structure as recited in claim 7, wherein said combustor liner is entrapped between said diffuser housing and said combustor housing.

9. A miniature gas turbine engine comprising:
a forward cover defining an airflow passage;
a forward housing defining a first and a second lubrication passage;
a diffuser housing mounted to said forward housing;
a combustor housing mounted to said diffuser housing;
a forward rotor shaft bearing mounted adjacent said forward housing;
an aft rotor shaft bearing mounted adjacent said forward housing; and
a rotor shaft rotationally mounted to said forward and aft rotor shaft bearings, said rotor shaft defining an axis of rotation;
said first lubrication passage for communication of a lubricant toward said forward rotor shaft bearing;
said second lubrication passage for communication of said lubricant toward said aft rotor shaft bearing;
said airflow passage for communication of airflow generally parallel to said axis of rotation from said forward rotor shaft bearing toward said aft rotor shaft bearing.

10. The engine as recited in claim 9, further comprising a metering jet within said forward housing and within each of said first and said second lubrication passage.

11. The engine as recited in claim 9, further comprising a metering jet upstream and in communication with each of said first and said second lubrication passage.

12. The engine as recited in claim 9, further comprising a pump driven by said rotor shaft to communicate a lubricant through said first and second lubrication passage.

13. The engine as recited in claim 9, further comprising an exhaust pipe welded to said combustor housing.

14. The engine as recited in claim 9, further comprising a combustor liner sandwiched without fasteners between said diffuser housing and said combustor housing.

15. The engine as recited in claim 9, further comprising a turbine nozzle mounted without fasteners between said diffuser housing and said combustor housing.

* * * * *